(12) United States Patent
Lohrentz et al.

(10) Patent No.: US 9,743,587 B2
(45) Date of Patent: Aug. 29, 2017

(54) BREAKAWAY STALK STOMPER FOR CORN HEADER

(71) Applicant: AGCO Corporation, Hesston, KS (US)

(72) Inventors: Randall Lohrentz, Buhler, KS (US); Daniel Dreyer, Hesston, KS (US); David Holt, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 31 days.

(21) Appl. No.: 14/985,235

(22) Filed: Dec. 30, 2015

(65) Prior Publication Data

US 2016/0183468 A1 Jun. 30, 2016

Related U.S. Application Data

(60) Provisional application No. 62/098,196, filed on Dec. 30, 2014.

(51) Int. Cl.
| | |
|---|---|
| A01D 41/14 | (2006.01) |
| A01D 46/08 | (2006.01) |
| A01D 75/28 | (2006.01) |
| A01D 45/02 | (2006.01) |
| A01D 34/835 | (2006.01) |
| A01D 75/18 | (2006.01) |

(52) U.S. Cl.
CPC ....... *A01D 45/021* (2013.01); *A01D 34/8355* (2013.01); *A01D 75/18* (2013.01)

(58) Field of Classification Search
CPC .... A01D 34/8355; A01D 75/00; A01D 75/18; A01B 61/046; A01B 35/20; A01B 35/24
See application file for complete search history.

(56) References Cited

U.S. PATENT DOCUMENTS

| | | | | |
|---|---|---|---|---|
| 3,536,146 A | * | 10/1970 | Groenke | A01B 35/24 172/710 |
| 3,747,311 A | * | 7/1973 | DeCoene | A01D 41/141 56/208 |
| 3,925,971 A | * | 12/1975 | Goering | A01D 89/004 56/15.8 |
| 4,011,915 A | * | 3/1977 | Anderson | A01B 35/24 172/265 |
| 4,573,308 A | * | 3/1986 | Ehrecke | A01D 41/14 56/14.4 |
| 4,723,608 A | * | 2/1988 | Pearson | A01B 63/22 172/265 |

(Continued)

OTHER PUBLICATIONS

Intellectual Property Office, International Search Report for related UK Patent Application No. GB1500833.7, dated Jun. 22, 2015.

*Primary Examiner* — Árpád Fábián-Kovács

(57) ABSTRACT

A plant stalk stomper assembly is operable to be mounted relative to a toolbar of a row crop header for advancement over the ground in a forward travel direction. The stomper assembly includes a frame and an elongated stomper skid plate operable to engage the ground as the stomper assembly is advanced in the forward travel direction. The skid plate presents an attachment section along which the skid plate is mounted relative to the frame. At least part of the skid plate includes a unitary plate element that depends below the attachment section to present a lowermost ground-engaging margin. The unitary plate element includes a deformation region located between the attachment section and the ground-engaging margin, with the unitary plate element operable to bend along the deformation region in response to relative movement between the attachment section and the ground-engaging margin.

18 Claims, 8 Drawing Sheets

(56) References Cited

U.S. PATENT DOCUMENTS

| | | | | |
|---|---|---|---|---|
| 4,835,954 | A | * | 6/1989 | Enzmann ............... A01D 41/14 56/296 |
| 5,174,101 | A | * | 12/1992 | Rabitsch ............... A01D 41/14 56/119 |
| 7,198,428 | B2 | * | 4/2007 | Pizzuto ................. A01B 31/00 172/180 |
| 8,201,388 | B1 | * | 6/2012 | Vandeven ............ A01D 41/141 56/10.2 E |
| 2002/0069628 | A1 | * | 6/2002 | Metzger .............. A01D 41/141 56/10.2 E |
| 2002/0112461 | A1 | * | 8/2002 | Burk .................. A01D 34/8355 56/504 |
| 2011/0179758 | A1 | * | 7/2011 | Kitchel ................. A01D 45/02 56/52 |
| 2011/0271653 | A1 | * | 11/2011 | Vandeven ............ A01D 41/141 56/10.2 E |
| 2013/0019581 | A1 | * | 1/2013 | Hyronimus ............ A01D 63/00 56/314 |
| 2013/0020100 | A1 | * | 1/2013 | Shoup ................... A01B 61/046 172/762 |
| 2013/0020101 | A1 | * | 1/2013 | Shoup ................... A01B 39/22 172/763 |
| 2013/0061569 | A1 | | 3/2013 | McClenathen |
| 2013/0174529 | A1 | | 7/2013 | Hyronimus et al. |
| 2013/0177348 | A1 | * | 7/2013 | Hyronimus ............ A01D 75/00 403/164 |
| 2013/0192857 | A1 | * | 8/2013 | Shoup ................... A01B 35/20 172/833 |
| 2014/0131973 | A1 | * | 5/2014 | Benoit ............... A01D 34/8355 280/160 |
| 2015/0096773 | A1 | * | 4/2015 | Miller ................. A01D 34/8355 172/540 |

\* cited by examiner

BREAKAWAY STALK STOMPER FOR CORN HEADER

RELATED APPLICATION

Under provisions of 35 U.S.C. §119(e), Applicant claims the benefit of U.S. Provisional Application No. 62/098,196, entitled BREAKAWAY STALK STOMPER FOR CORN HEADER and filed Dec. 30, 2014, which is incorporated herein by reference.

BACKGROUND

Field of Invention

The present invention relates generally to row crop harvesters. More specifically, embodiments of the present invention concern a row crop header that includes a stalk stomper.

Discussion of Prior Art

Conventional row crop harvesters include a row crop header with a plurality of discrete row units spaced laterally along the header length. The header is positioned so that each row unit is aligned with a row of plants to be harvested and is advanced along the rows to sever the plant stalks and receive an upper part of the plants.

However, conventional row crop headers have various deficiencies. For instance, prior art headers sever the plant stalks so that a lower part of the plant stalk remains standing. For plants with relative large-diameter stalks, such as corn, the remaining stalk can puncture or otherwise damage a tire of the harvester (or another vehicle traveling across the field).

One known device to restrict stalks from puncturing a harvester tire is a stalk stomper. The stalk stomper may be attached to the header in lateral alignment with a wheel of the harvester and/or each of the row units. The stalk stomper is positioned to engage stalks as the header is advanced in the forward direction. More specifically, the stalk stomper is configured to engage and knock down the remaining stalks.

However, headers with conventional stomper mechanisms also have certain deficiencies. Known stalk stompers are prone to being damaged and causing damage to other parts of the header during operation. For example, when a header with prior art stalk stompers moves along the ground in a reverse direction, the stalk stomper can dig into the ground such that the stalk stomper and/or the header are damaged. Similarly, if a stalk stomper encounters a rigid obstacle projecting above the ground during header movement, a collision between the stalk stomper and the obstacle can cause damage to various components of the stalk stomper and/or the header.

SUMMARY

The following brief summary is provided to indicate the nature of the subject matter disclosed herein. While certain aspects of the present invention are described below, the summary is not intended to limit the scope of the present invention.

Embodiments of the present invention provide a harvesting header that does not suffer from the problems and limitations of the prior art headers set forth above.

A first aspect of the present invention concerns a plant stalk stomper assembly operable to be mounted relative to a toolbar of a row crop header for advancement over the ground in a forward travel direction. The stomper assembly broadly includes a frame and an elongated stomper skid plate. The frame is operable to attach the stomper assembly relative to the toolbar. The skid plate is operable to engage the ground as the stomper assembly is advanced in the forward travel direction. The skid plate presents an attachment region along which the skid plate is mounted relative to the frame. At least part of the skid plate includes a unitary plate element that depends below the attachment region to present a lowermost ground-engaging margin. The unitary plate element includes a deformation region located between the attachment region and the ground-engaging margin, with the unitary plate element operable to bend along the deformation region in response to relative movement between the attachment region and the ground-engaging margin.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 5:
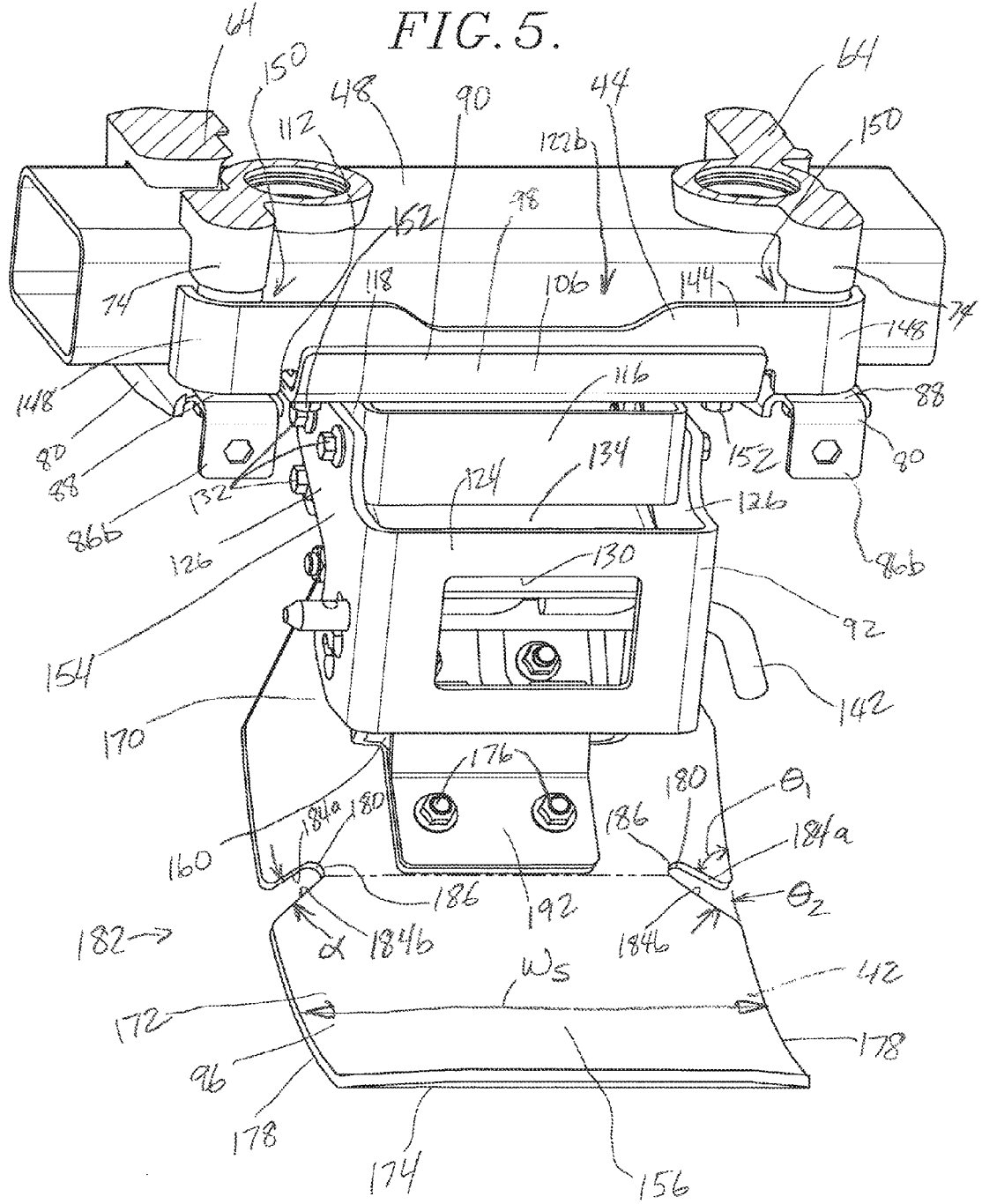
Figure 6:
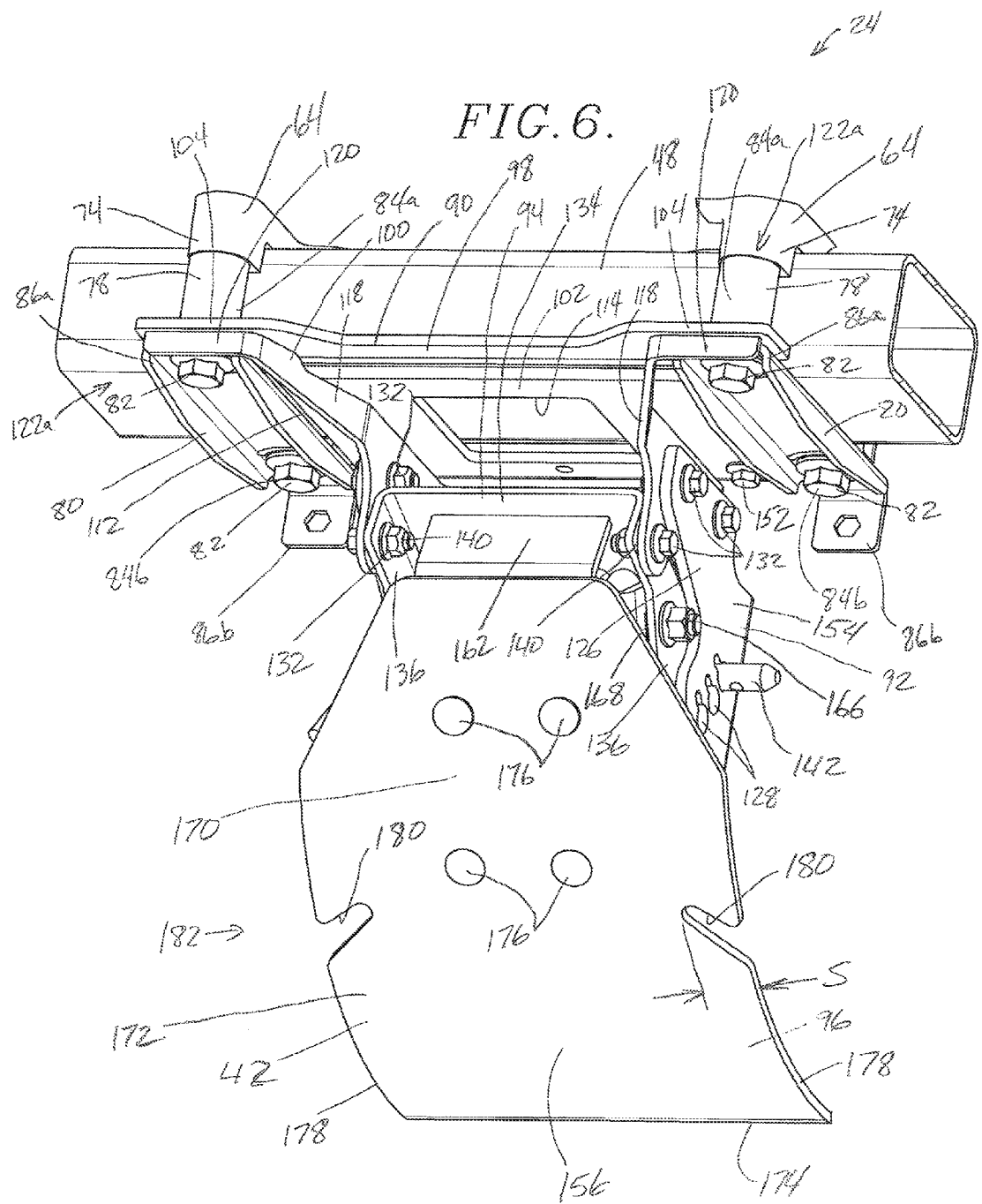
Figure 7:
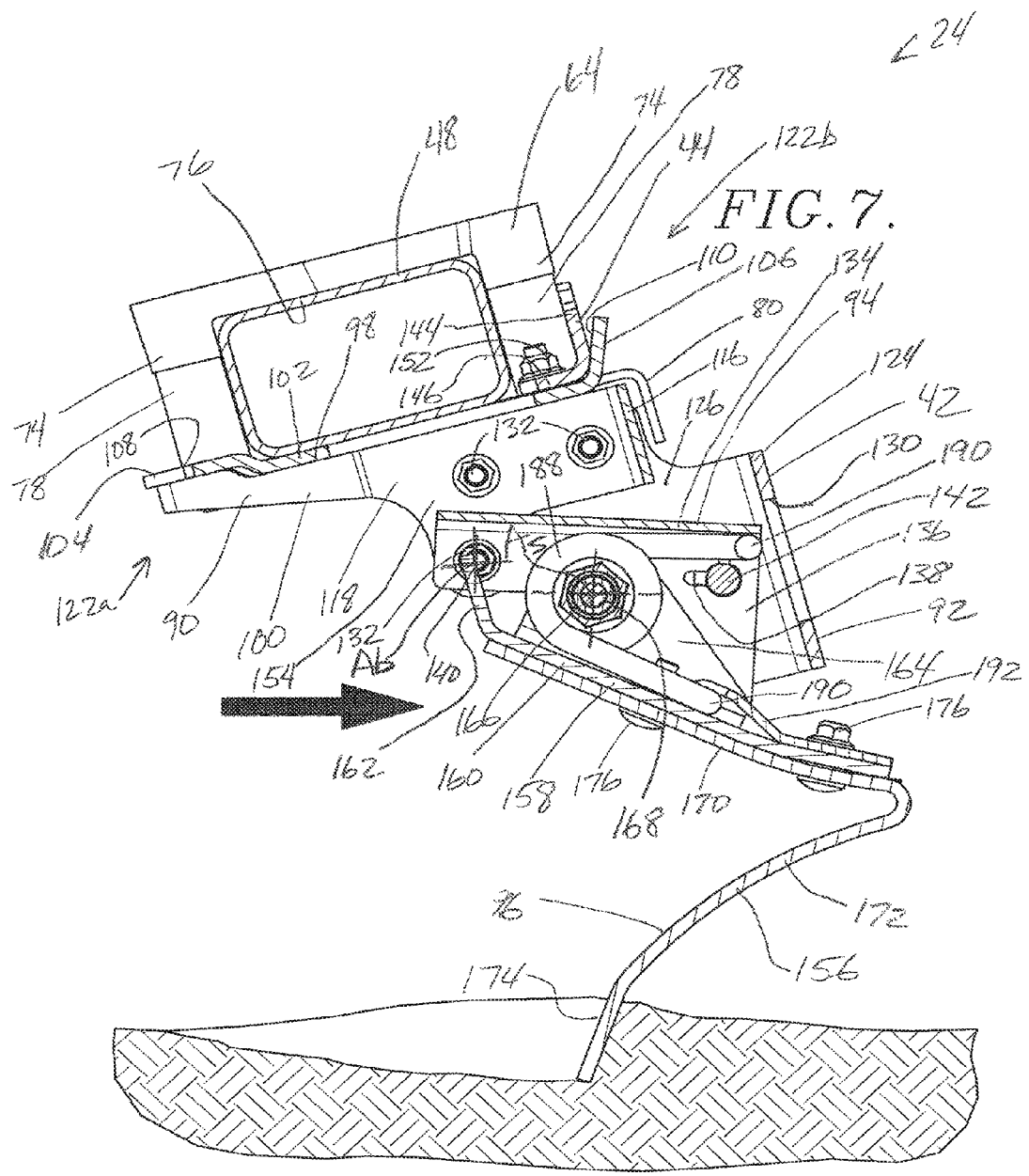
Figure 8:
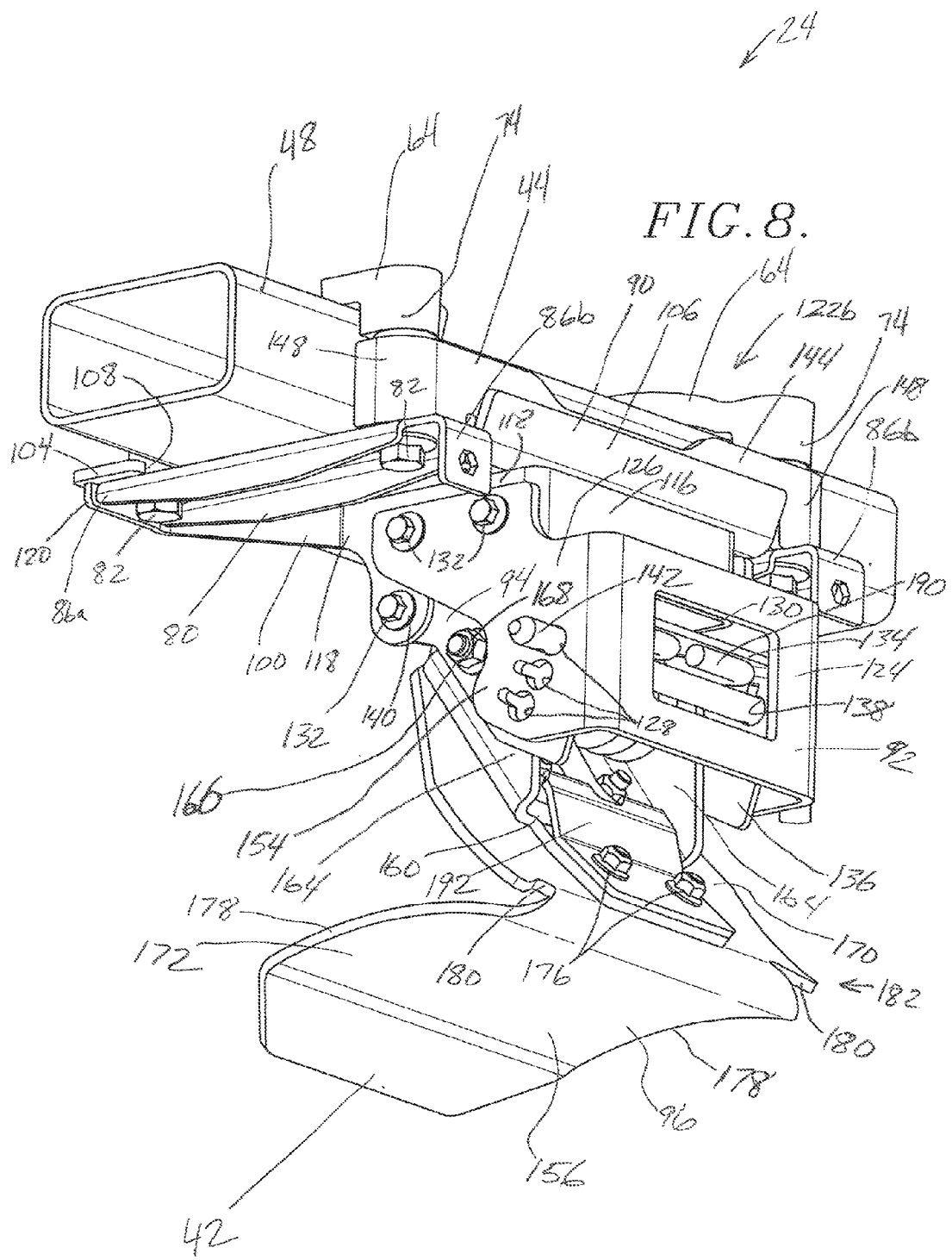

FIG. 5 is a fragmentary rear perspective of the row crop header shown in FIGS. 1-4, showing a toolbar of the header frame, lowermost portions of the row unit housing secured to the toolbar with brackets and tubular spacers, and a stalk stomper mounted to the toolbar with a brace, and showing a skid plate of the stalk stomper, with a pair of transverse slots presented in a deformation region of the skid plate between an attachment section and a lowermost margin of the skid plate;

FIG. 6 is a fragmentary front perspective of the row crop header similar to FIG. 5, but viewed from the front of the header;

FIG. 7 is a fragmentary cross section of the row crop header shown in FIGS. 1-6, showing the stalk stomper and brace secured to the toolbar, and showing the skid plate as being bent along the deformation region of the skid plate, with the skid plate being bent due to engagement of the lowermost margin with the ground and rearward movement of the stalk stomper; and FIG. 8 is a fragmentary rear perspective of the row crop header shown in FIG. 7, showing the bent skid plate, with the bend extending transversely along the deformation region of the skid plate.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
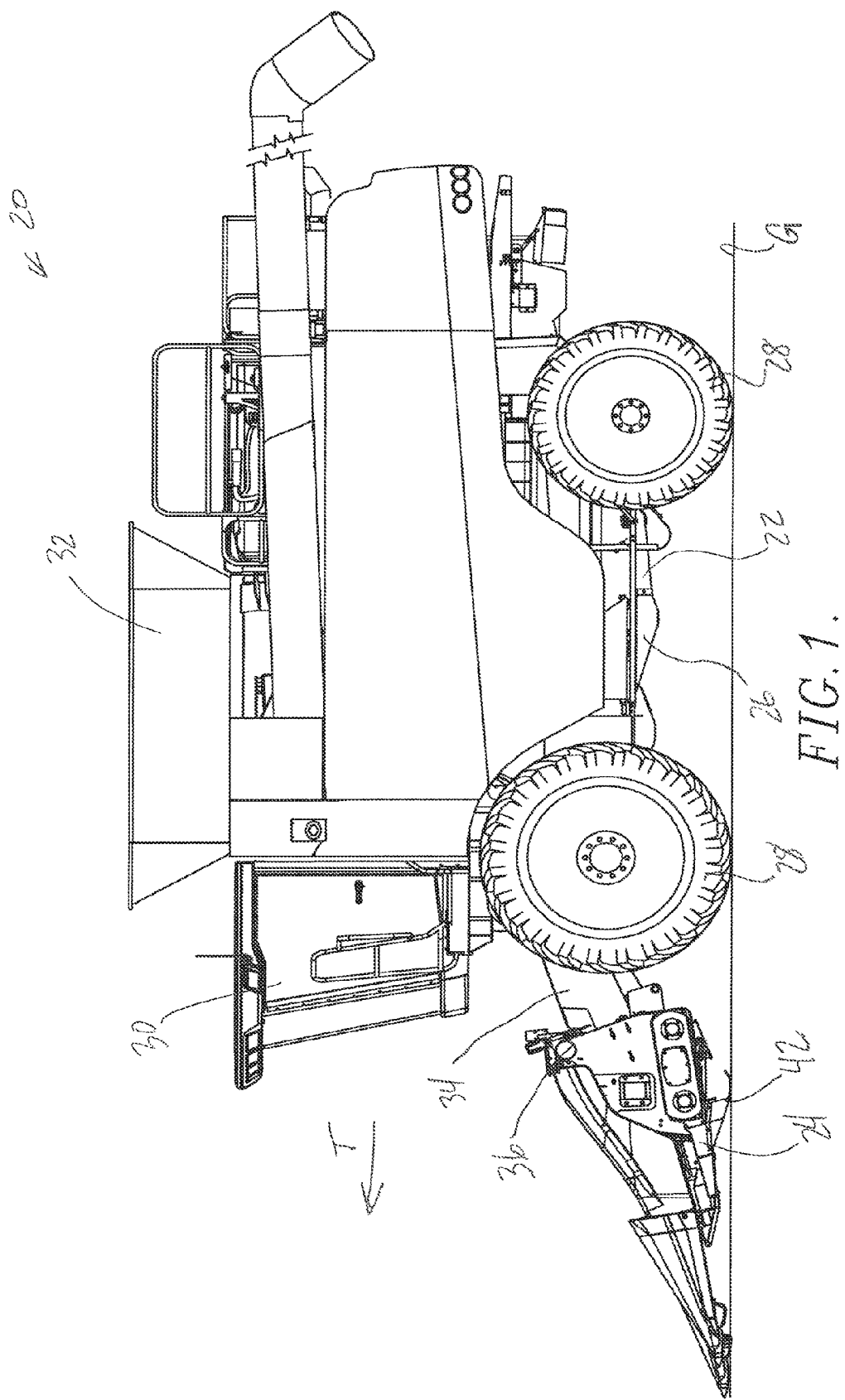
FIG. 1 is a side elevation of a row crop harvester constructed in accordance with a preferred embodiment of the present invention, with the harvester including a wheeled chassis, a feederhouse shiftably supported by the chassis, and a row crop header mounted on an end of the feederhouse.
Figure 2:
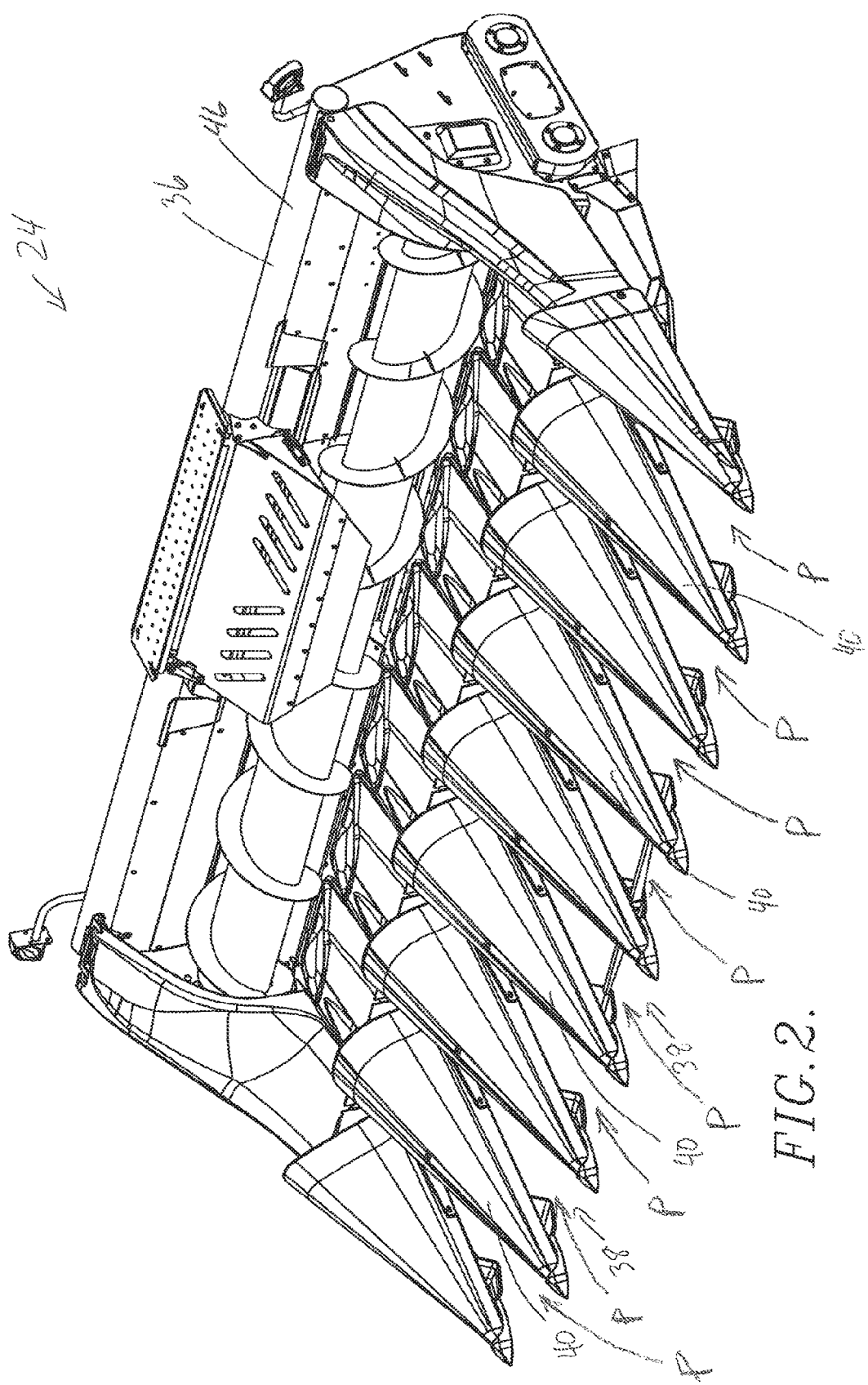
FIG. 2 is a front perspective of the row crop header shown in FIG. 1, showing among other things, a header frame, an auger, and a series of row unit hoods spaced laterally along the header frame.
Figure 3:
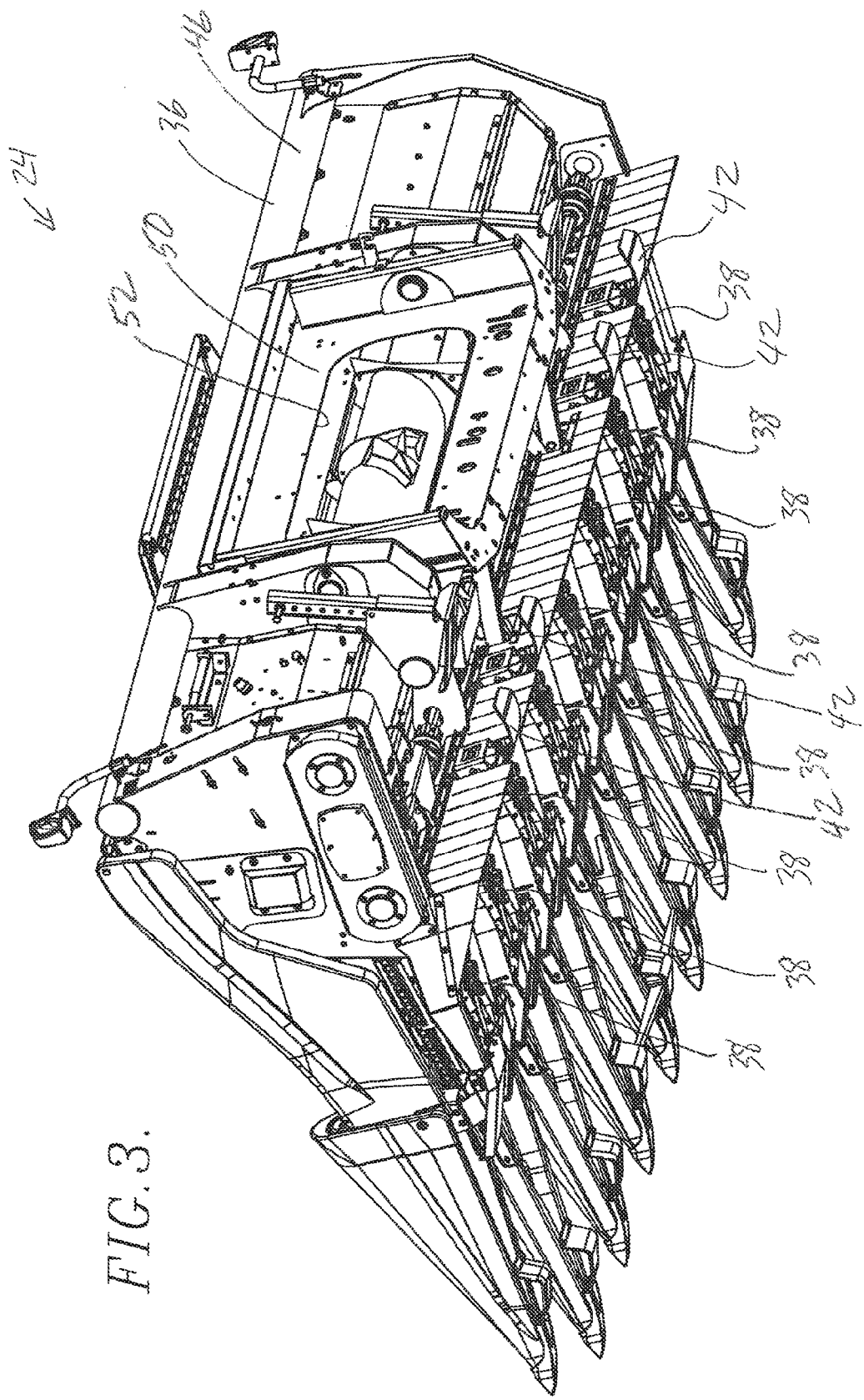
FIG. 3 is a lower perspective of the row crop header shown in FIGS. 1 and 2, showing the header frame, a series of row units supported below the hoods, and stalk stompers supported below the row units.
Figure 4:
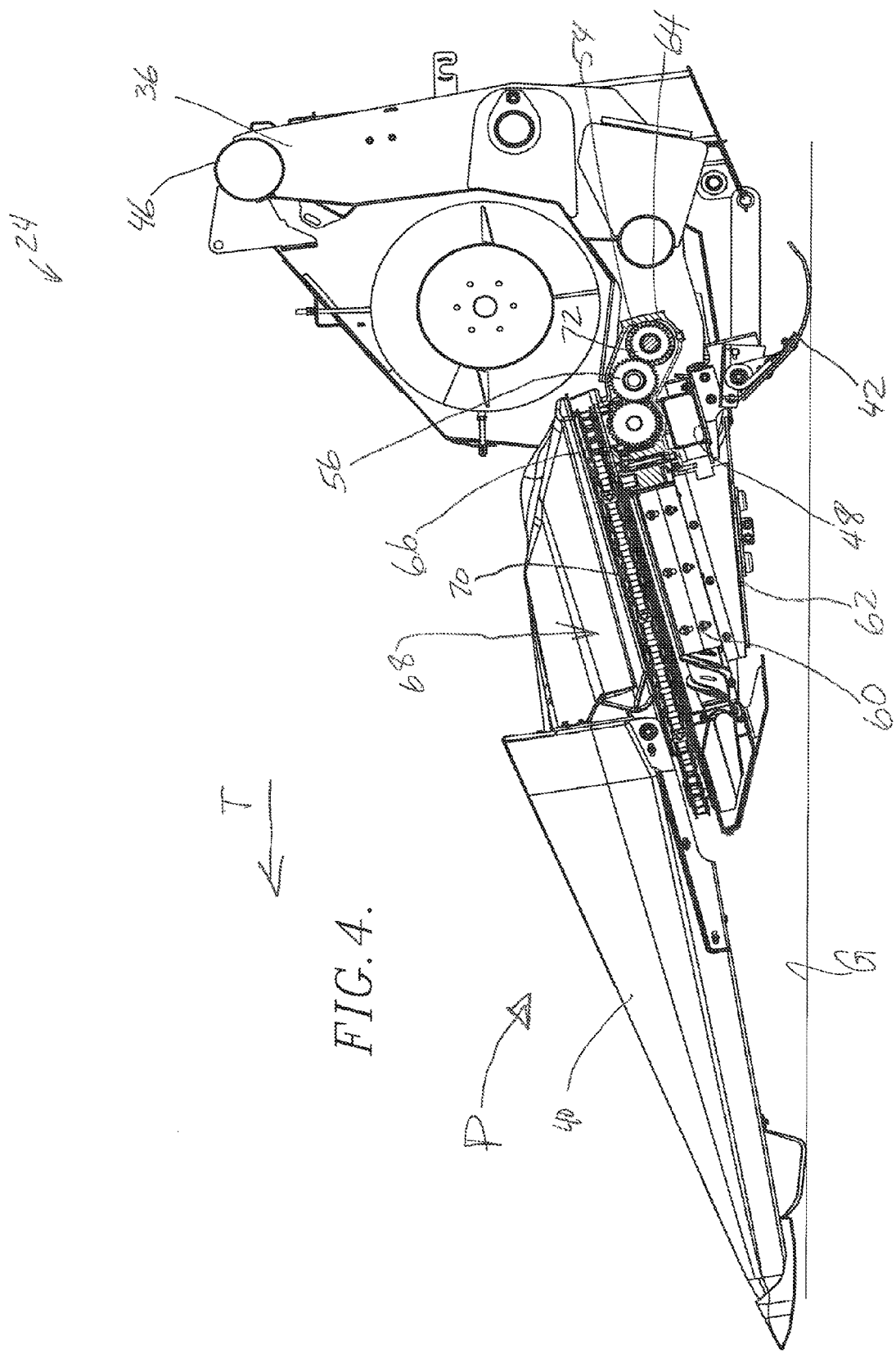
FIG. 4 is a cross section of the row crop header shown in FIGS. 1-3, showing a row unit housing, a row unit drive, a gathering chain assembly, a stalk roll, and a blade chopper of one of the row units.

Turning initially to FIG. 1, a crop harvester 20 is constructed in accordance with a preferred embodiment of the present invention. In the usual manner, the harvester 20 is operable to be advanced in a forward travel direction T to sever crop from a field (not shown). The harvester 20 presents a fore-and-aft extending longitudinal axis that extends in the travel direction T. As is customary, the illustrated harvester 20 produces clean grain from the severed crop material by separating the clean grain from material other than grain (MOG).

The illustrated crop harvester 20 is preferably configured to harvest a row crop, such as corn, and broadly includes a wheeled chassis 22 and a row crop header 24. Preferably, the wheeled chassis 22 comprises a self-propelled machine that collects the separated grain and generally discharges MOG onto the field. The wheeled chassis 22 preferably includes a harvester frame 26, wheels 28, operator enclosure 30, an engine (not shown) that powers the harvester 20, a storage bin 32 operable to store clean grain separated from MOG, and a feederhouse 34.

Turning to FIGS. 1-4, the row crop header 24 comprises a corn header that is operable to be advanced along a series of side-by-side corn rows (not shown) to sever and gather corn plants from the field. However, it is within the ambit of the present invention where the header 24 is alternatively configured and used to harvest other row crops, such as sorghum, soybeans, sunflowers, etc. The header 24 preferably includes a header frame 36, a plurality of row units 38 spaced laterally along the length of the header frame 36 (see FIG. 3), hoods 40 spaced laterally and positioned above the row units 38 (see FIG. 2), and stalk stompers 42. Each stalk stomper 42 preferably includes a removable brace 44, as will be discussed further.

The header frame 36 supports the row units 38, hoods 40, and the stalk stompers 42 above the ground G. The header frame 36 preferably includes, among other things, an upper beam 46 and a lower toolbar 48 that both extend laterally relative to the travel direction T and along the length of the header frame 36. In the usual manner, the header frame 36 further includes a rear mounting interface 50 that is removably attached to a forward end of the feederhouse 34. The rear mounting interface 50 presents a header discharge opening 52 through which severed plant material is discharged from the header to the feederhouse 34 (see FIG. 3). As will be discussed, the toolbar 48 is attached to and supports the row units 38, hoods 40, and the stalk stompers 42.

The row units 38 are operable to be supported by the header frame 36 and advanced along the corn rows so that each row unit 38 collects a series of plants that define a respective one of the corn rows. In particular, each row unit 38 defines a fore-and-aft extending row path P (see FIG. 2) along which the row unit 38 is operable to collect the respective corn row. Again, the principles of the present invention are applicable where the row units 38 (and other components of the header 24) are configured for harvesting row crops other than corn. Each row unit 38 preferably includes a row unit housing 54, a row unit drive 56, a pair of gathering chain assemblies 58, a pair of stalk rolls 60, and a blade chopper 62 (see FIG. 4). The row unit housing 54 includes a drive housing 64 and a deck plate 66 (see FIG. 4).

The deck plate 66 includes a pair of side-by-side deck plate sections located vertically between the gathering chain assemblies 58 and the stalk rolls 60. The deck plate sections are located adjacent to one another to cooperatively define an elongated deck plate opening 68 that receives the plant stalks and at least partly forms the row path P.

In the usual manner, the pair of gathering chain assemblies 58 are positioned along opposite sides of the deck plate opening 68 to cooperatively urge plants rearwardly through the deck plate opening 68. More particularly, each gathering chain assembly 58 includes an endless chain that presents an inboard run 70 and an outboard run (not shown). For each pair of gathering chain assemblies 58, the inboard runs 70 are opposed to one another and cooperatively engage the plants. Furthermore, as the pair of gathering chain assemblies 58 are operated, the corresponding inboard runs 70 both move rearwardly to cooperatively move the plants rearwardly relative to the deck plate 66.

The pair of stalk rolls 60 are positioned along opposite sides of the deck plate opening 68 and rotate in opposite directions to cooperatively pull the plant stalks downwardly. In particular, the stalk rolls 60 provide multiple pairs of blades that rotate into and out of engagement with one another. As the stalk rolls 60 are rotated, each pair of blades moves generally in a downward direction as the pair of blades rotate into and out of engagement. Thus, while the stalk rolls 60 are rotated, each pair of blades operates to pinch the plant stalks and pull the plant stalks downwardly.

The drive 56 is operable to power the gathering chain assemblies 58 and the stalk rolls 60. The drive 56 preferably includes a gear train 72 located within the drive housing 64 and a motor (not shown) that powers the gear train 72. The gear train 72 is operably housed within the drive housing 64.

The drive housing 64 comprises a rigid sealed enclosure and preferably includes lower mounting bosses 74 with internal threads (not shown). The drive housing 64 also presents lateral channels 76 that extend between pairs of the bosses 74 (see FIG. 7). The channels 76 are sized and configured to securely receive the toolbar 48.

The row unit housing 54 also preferably includes tubular spacers 78, a pair of elongated brackets 80, and threaded bolts 82 (see FIG. 6). The spacers 78 and bolts 82 cooperatively provide forward and aft fasteners 84a,b to secure the illustrated drive housing 64 to the toolbar 48. The brackets 80 each comprise a unitary rigid element that is elongated and presents forward and rearward bracket ends 86a,b (see FIG. 6), with fastener holes (not shown) being adjacent the bracket ends 86a,b. Each bracket 80 presents a generally planar upper support surface 88 (see FIG. 5) that extends along the length of the bracket 80. While the illustrated brackets 80 are preferred to secure the drive housing 64 to the toolbar 48, the brackets 80 could be alternatively constructed without departing from the scope of the present invention. Also, each drive housing 64 could be secured to the toolbar 48 with an alternative number of brackets 80 (e.g., where the drive housing 64 is mounted with a single bracket 80).

The spacers 78 each have a cylindrical outer surface and present a bore (not shown) that extends through the spacer 78. The bore is sized to slidably receive a corresponding one of the bolts 82. The bolts 82 are removably inserted through the spacers 78 so as to be threaded into the bosses 74. While the illustrated fasteners 84a,b are preferred, the principles of the present invention are applicable where the row unit housing 54 includes alternative fasteners for being secured to the toolbar 48

The drive housing 64 is removably secured to the toolbar 48 by positioning the drive housing so that the channel 76 receives the toolbar 48, with bosses 74 located on opposite sides of the toolbar 48. Each bracket 80 is positioned below the toolbar 48 so that the support surface 88 faces upwardly and receives a pair of spacers 78. The bolts 82 are inserted through the bracket 80 and the corresponding spacers 78 by aligning the bores of the spacers 78 with the fastener holes of the bracket 80.

With the bracket 80, spacers 78, and bolts 82 being located below the toolbar 48 and the support surface 88 facing upwardly, the bolts 82 can be threaded into engagement with the respective bosses 74. The bolts 82 are threaded into engagement with the bosses 74 so that the support surface 88 is brought into engagement with the toolbar 48, with the drive housing 64 and the bracket 80 being clamped against opposite sides of the toolbar 48. In this manner, the row unit housing 54 is securely mounted to the toolbar 48. However, it is within the ambit of the present invention where the row unit housing 54 is alternatively mounted on the toolbar 48. For instance, the header 24 could include mounting components other than the spacers 78, brackets 80, and fasteners 84a,b to secure the drive housing 64 to the toolbar 48.

Turning to FIGS. 5-8, each stomper 42 is laterally aligned with a respective one of the row paths P to engage and knock down severed plant stalks (not shown) along the corresponding corn row. As will be described in greater detail, the stomper 42 is preferably attached relative to the toolbar 48. Most preferably, the stomper 42 can be attached and detached relative to the toolbar 48 without attaching or removing the fasteners 84a,b from the row unit housing 54. The illustrated stomper 42 preferably includes a mounting base 90, a skid support bracket 92, a skid adjustment bracket 94, and a skid 96.

Preferably, the mounting base 90 comprises a rigid structure and includes a mounting plate 98 and a reinforcing rim 100 (see FIGS. 6 and 8). The illustrated mounting plate 98 is unitary and preferably includes a body 102, a pair of forward tabs 104 that project laterally from the body 102, and a rearward upturned lip 106. The depicted tabs 104 each present curved notches 108 (see FIGS. 7 and 8) that face rearwardly. As will be described further, the notches 108 are operable to receive and engage corresponding ones of the fasteners 84a,b. However, it is within the ambit of the present invention where the tabs 104 are alternatively configured. For instance, the tabs 104 could be constructed to removably grasp the corresponding fastener 84a,b (e.g., where the notches 108 are shaped so that the tabs 104 are snapped into and out of engagement with the fasteners 84a,b). For some aspects of the present invention, the tabs 104 could each present a hole to receive one of the fasteners 84a,b such that attachment and removal of the mounting base 90 requires attachment and removal of the fasteners 84a,b from the drive housing 64.

The lip 106 is unitary and preferably presents a cam surface 110 (see FIG. 7) that faces forwardly and is aligned relative to the body 102 at an oblique angle. As will be discussed further, the cam surface 110 of the lip 106 slidably engages the brace 44. It will be appreciated that the lip 106 could be alternatively configured without departing from the scope of the present invention. For instance, the lip 106 could include multiple sections spaced laterally from one another.

The body 102 of the mounting plate 98 interconnects the tabs 104 and the lip 106 of the mounting plate 98. The body 102 preferably includes a flat plate that presents longitudinal side edges 112 and a central opening 114 (see FIGS. 5 and 6).

The reinforcing rim 100 is unitary and includes a rear wall 116, side walls 118, and forward end walls 120 (see FIGS. 6 and 8). The rim 100 is preferably positioned so that the rear wall 116 extends laterally below the lip 106, the side walls 118 extend longitudinally adjacent to corresponding side edges 112, and the end walls 120 extend below corresponding tabs 104. The illustrated mounting plate 98 and rim 100 are preferably welded to one another. The mounting plate 98 and reinforcing rim 100 each preferably include an alloy carbon steel material, although these components could include an alternative material.

The mounting plate 98 and reinforcing rim 100 cooperatively present forward and aft mounting ends 122a, 122b of the mounting base 90 (see FIGS. 5-8). The forward mounting end 122a preferably includes the forward tabs 104. The aft mounting end 122b preferably includes the rearward upturned lip 106. However, it will be appreciated that the mounting ends 122a,b could be alternatively configured without departing from the scope of the present invention.

The skid support bracket 92 preferably comprises a unitary, generally U-shaped structure and includes a rear wall 124 and side walls 126. Each side wall 126 presents three (3) slotted openings 128 positioned alongside one another (see FIG. 8). The rear wall 124 presents a central opening 130. A plurality of fasteners 132 (see FIGS. 6 and 8) serve to secure the side walls 126 of the skid support bracket 92 to the side walls 118 of the rim 100.

The illustrated skid adjustment bracket 94 comprises a unitary structure and preferably includes a top wall 134 and side walls 136 (see FIGS. 6-8). Each side wall 136 presents a slotted opening 138 (see FIG. 7).

Each side wall 136 of the skid adjustment bracket 94 is pivotally attached to a corresponding side wall 118 of the rim 100 by fasteners 132. The fasteners 132 also form pivot joints 140 (see FIG. 7). Thus, the pivot joints 140 permit the skid adjustment bracket 94 to swing relative to the mounting base 90 and the skid support bracket 92 about a transverse bracket pivot axis Ab (see FIG. 7).

The skid adjustment bracket 94 is adjustably connected to the skid support bracket 92 with a removable pin 142. In particular, the pin 142 can be selectively inserted through the slotted openings 138 of the skid adjustment bracket 94 and through a corresponding pair of the slotted openings 128 of the skid support bracket 92. Thus, the pin 142 is operable to removably secure the skid adjustment bracket 94 in one of three (3) discrete positions relative to the skid support bracket 92.

Referring again to FIGS. 5-9, each brace 44 is unitary and includes a rear wall 144 and a lower flange 146 (see FIG. 7). The rear wall 144 includes endmost tabs 148 that project laterally beyond the lower flange 146. The tabs 148 preferably curve forwardly and cooperate with the flange 146 to present open slots 150 (see FIG. 5).

The brace 44 is preferably positioned so that the tabs 148 engage corresponding spacers 78, with the spacers 78 being received by the open slots 150. At the same time, the tabs 148 engage the brackets 80 so that the brackets 80 support the brace 44.

With the brace 44 supported by the brackets 80, the stomper 42 can be secured to the toolbar 48. The stomper 42 is initially positioned so that the tabs 104 of the mounting base 90 are positioned on the forward margins of corresponding brackets 80, with the notches 108 receiving respective spacers 78. As the tabs 104 are positioned in this manner, the upturned lip 106 of the mounting base 90 is preferably spaced below the brace 44. The interconnection of the tabs 104, the spacers 78, and the front ends of the brackets 80 permits the stomper 42 to be swung relative to the toolbar 48 through a limited range of pivotal movement about a lateral axis. In particular, this connection permits pivoting of the stomper 42 into and out of a mounted position (see FIGS. 6-8).

With the tabs 104 of the mounting base 90 supported on the brackets 80, the stomper 42 can be swung into and selectively secured in the mounted position. In the illustrated embodiment, the header 24 includes fasteners 152 that extend through the mounting plate 98 and the flange 146 of the brace 44 to secure these components to one another (see FIG. 7).

The mounting base 90, skid support bracket 92, skid adjustment bracket 94, removable fastening pin 142, and the removable brace 44 cooperatively provide an adjustable stomper frame 154 operable to selectively attach the stalk stomper 42 relative to the toolbar 48. As discussed above, the skid adjustment bracket 94 of the stomper frame 154 is selectively secured by the pin 142 in one of a plurality of positions relative to the skid support bracket 92, which controls the orientation of the skid 96. Additional preferred details regarding the use of the brace 44 to secure the stalk stomper 42 to the toolbar 48 are disclosed in copending provisional application entitled EASY MOUNT STALK STOMPER, which is appended hereto as Appendix A and is hereby incorporated in its entirety by reference herein.

Turning to FIGS. 7-9, the skid 96 is operable to engage and knock down severed stalks of corn (not shown) as the header 24 is advanced forwardly over the ground G. As the skid 96 is advanced, the skid 96 may be spaced above the ground G or may be in sliding engagement with the ground G. Most preferably, the skid 96 is configured to engage the ground G as the header 24 is advanced in the forward travel direction T. The skid 96 preferably includes a skid plate 156 and a plate mounting bracket 158.

The illustrated plate mounting bracket 158 is unitary and includes a base wall 160, a forward lip 162, and side walls 164. Preferably, a fastener 166 pivotally attaches the side walls 164 to corresponding side walls 136 of the skid adjustment bracket 94. The fastener 166 consequently forms a skid pivot joint 168 (see FIG. 7). Thus, the depicted plate mounting bracket 158 is used to pivotally support the skid 96 so that the skid 96 can pivot relative to the skid adjustment bracket 94 about a transverse skid pivot axis As (see FIG. 7).

The preferred skid plate 156 is also unitary and includes an attachment section 170 and a lower depending section 172 that depends below the attachment section 170. The depending section 172 preferably comprises a unitary plate element and includes a lowermost ground-engaging margin 174.

The skid plate 156 is removably secured to the plate mounting bracket 158 by fasteners 176 so that the skid plate 156 and plate mounting bracket 158 pivot with one another relative to the skid adjustment bracket 94. In the illustrated embodiment, the plate mounting bracket 158 is attached to the attachment section 170 of the skid plate 156, with the attachment section 170 being secured so as to be more rigid than the lower depending section 172.

Referring again to FIGS. 5-8, the skid plate 156 presents laterally outboard side edges 178 that cooperatively define a skid width dimension Ws (see FIG. 5). In the illustrated embodiment, the skid width dimension Ws preferably ranges from about two inches (2") to about eighteen (18") and, more preferably, is about nine and one-half inches (9.5"). The illustrated skid plate 156 also preferably presents transverse slots 180 that cooperatively form a deformation region 182 (see FIGS. 5-8). In the illustrated embodiment, the deformation region 182 is relatively weaker than the remainder of the skid plate 156. In other words, the deformation region 182 defines an intended failure location such that any deformation of the skid plate 156 will first occur in the deformation region 182 when the skid plate 156 is exposed to excessive forces. Such deformation of the deformation region 182 could be, at least partly, in the form of plastic deformation (such as bending deformation, as shown in the illustrated embodiment). Alternatively, under more extreme conditions, the deformation region 182 could experience, at least partly, plastic deformation and/or breakage (e.g., where the failure mode includes failure in bending, failure in shear, failure in tension, or a combination thereof).

The depicted slots 180 project laterally inboard from and extend at a generally oblique angle relative to corresponding side edges 178 of the skid plate 156. The deformation region 182 is preferably located between the attachment section 170 and the ground-engaging margin 174. However, it is within the ambit of the present invention where the deformation region 174 is alternatively located along the length of the skid plate 156. As will be discussed, the skid plate 156 is operable to bend along the deformation region 182 in response to relative movement between the attachment section 170 and the ground-engaging margin 174.

More specifically, each slot 180 presents forward and aft slot edges 184a,b that extend from a corresponding side edge 178 to a curved slot edge 186. In the illustrated embodiment, the forward slot edge 184a and the side edge 178 cooperatively define a first angle dimension $\theta_1$ (see FIG. 5). The first angle dimension $\theta_1$ preferably ranges from about thirty-five degrees (35°) to about seventy-five degrees (75°) and, more preferably, is about fifty-five degrees (55°). The aft slot edge 184b and the side edge 178 cooperatively define a second angle dimension $\theta_2$. The second angle dimension $\theta_2$ preferably ranges from about twenty-five degrees (25°) to about sixty-five degrees (65°) and, more preferably, is about forty-five degrees (45°). It will also be appreciated that the slot edges 184a,b (or portions thereof) could be oriented outside these dimensions without departing from the scope of the present invention. For instance, the illustrated slots 180 could extend substantially perpendicular to the side edges 178.

The illustrated slot edges 184a,b preferably taper toward each other in the inboard direction and cooperatively define an included angle dimension α. The included angle dimension a preferably ranges from about five degrees (5°) to about twenty degrees (20°) and, more preferably, is about ten degrees (10°). It will also be appreciated that the slot edges 184a,b could be alternatively oriented relative to one another. For instance, the slot edges 184a,b of each slot 180 could taper toward each other in the outboard direction. The slot edges 184a,b of each slot 180 could also be substantially parallel to one another.

The slots 180 each project inboard to define a lateral slot dimension S (see FIG. 6) measured perpendicular to the side edges 178. The lateral slot dimension S preferably ranges from about one half inch (0.5") to about two inches (2") and, more preferably, is about one and one-quarter inches (1.25").

Again, the skid plate 156 is operable to elastically deform and/or fail along the deformation region 182 in response to relative movement between the attachment section 170 and the ground-engaging margin 174. Where the stomper 42 is exposed to excessive forces, the deformation region 182 permits the depending section 172 to move relative to the attachment section 170. For instance, if the lowermost margin 174 digs into the ground G while the stomper 42 is moved rearwardly by the header 24, the skid plate 156 can bend along the deformation region 182 to permit rearward stomper movement. Thus, the skid plate 156 is designed to deform elastically in the deformation region 182 to permit corresponding movement of the header 24. Under more extreme conditions, the skid plate 156 is also preferably designed to fail in the deformation region 182 to avoid damaging the stomper mounting structure and other components of the header 24.

While the illustrated deformation region 182 of the skid plate 156 is preferred, the deformation region 182 could be alternatively provided without departing from the scope of the present invention. For instance, the deformation region 182 could present a plate thickness with a relatively smaller thickness dimension compared to the thickness dimension of adjacent parts of the skid plate 156. Also, the deformation region 182 could include a line of regularly spaced holes that provide a continuous line of weakness extending continuously between the side edges 178. The deformation region 182 could also include other configurations of a line of weakness, such as a continuous transverse groove formed in the skid plate 156.

Yet further, the skid plate 156 could include a joining section formed of another material, where the joining section interconnects sections of the skid plate 156, so that the joining section deforms and/or breaks in response to an excessive force applied to the skid plate 156. In such an alternative embodiment, the joining section could include an alternative material, such as an alternative metal (e.g., aluminum, carbon steel, or stainless steel), a synthetic resin material, etc.

When the skid plate 156 is mounted to the plate mounting bracket 158, the lowermost end of the bracket 158 is preferably longitudinally aligned with the deformation region 182. The configuration of the deformation region 182 permits the skid plate 156 to bend along the deformation region 182 in response to relative movement between the attachment section 170 and the ground-engaging margin 174 (e.g., due to an excessive force applied to the skid plate 156).

The deformation region 182 is preferably located rearwardly of the mounting plate 98. Furthermore, with the stomper 42 secured on the toolbar 48, the deformation region 182 is preferably located rearwardly of the toolbar 48. However, it is within the scope of the present invention where the stomper 42 is alternatively located relative to the toolbar 48.

Again, the skid 96 is pivotally mounted at the skid pivot joint 168 so that the skid 96 can pivot relative to the skid adjustment bracket 94. However, it will be appreciated that the skid 96 could be alternatively mounted. For instance, the skid 96 could be slidably mounted relative to the mounting base 90 to slide up and down along an upright direction.

The forward lip 162 extends upwardly to restrict pivotal movement of the skid 96. More particularly, the skid 96 is pivotal into and out of a lowermost skid position (see FIGS. 5 and 6) where the forward lip 162 engages the top wall 134 of the skid adjustment bracket 94. Consequently, the forward lip 162 and the skid adjustment bracket 94 cooperatively restrict the lowermost margin 174 of the skid 96 from pivoting downwardly beyond the lowermost skid position.

The stalk stomper 42 also preferably includes a torsion spring 188 mounted on the skid pivot joint 168 (see FIG. 7). The torsion spring 188 includes spring ends 190, with one of the spring ends 190 engaging the top wall 134 and the other spring end 190 secured to the plate mounting bracket 158. More particularly, a keeper strap 192 and the fasteners 176 serve to secure the spring end 190 to the plate mounting bracket 158. The torsion spring 188 is preferably configured to urge the skid 96 into the lowermost skid position. However, it is within the ambit of the present invention where the stomper 42 includes an alternative device to urge the skid 96 into the lowermost skid position. For instance, the stomper 42 could include an alternative mechanical spring or a hydraulic cylinder. It will also be appreciated that such mechanisms could also be used to selectively urge the skid 96 in an upward direction. Furthermore, the stomper 42 could include a motion damping mechanism to control movement of the skid 96 relative to the mounting base 90.

The skid support bracket 92, skid adjustment bracket 94, and the skid 96 each preferably include an alloy carbon steel material, although one or more of these components could include an alternative material.

In operation, the stomper 42 is removably secured relative to the toolbar 48. The stomper 42 is initially positioned so that the tabs 104 of the mounting base 90 are located on the forward margins of corresponding brackets 80, with the notches 108 receiving respective spacers 78. At the same time, the upturned lip 106 of the mounting base 90 is preferably spaced below the brace 44. The stomper 42 can then be swung relative to the toolbar 48 into a mounted position so that the lip 106 engages the brace 44 (see FIGS. 6 and 8). While in this position, fasteners 152 can be extended through the mounting plate 98 and the flange 146 of the brace 44 to secure these components to one another.

With the stomper 42 secured, the header 24 can be advanced over the ground G in the forward direction to harvest multiple rows of corn. As the header 24 is advanced, the stomper 42 moves along the ground G to engage and knock down the severed stalks of one of the corn rows. In the event that the stomper 42 is exposed to excessive forces, the deformation region 182 permits the depending section 172 to move relative to the attachment section 170. For instance, if the lowermost margin 174 digs into the ground G while the stomper 42 is moved rearwardly by the header 24, the skid plate 156 can bend along the deformation region 182 to permit rearward stomper movement while restricting the rest of the stomper 42 and the header 24 from being damaged. In extreme cases of excessive load, failure of the stomper 42 (e.g., by plastic deformation and/or breakage through failure in shear, failure in tension, and/or failure in bending) is designed to occur first in the deformation region 182.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A plant stalk stomper assembly operable to be mounted relative to a toolbar of a row crop header for advancement over the ground in a forward travel direction, said stomper assembly comprising:
a frame operable to attach the stomper assembly relative to the toolbar; and
an elongated stomper skid plate operable to engage the ground as the stomper assembly is advanced in the forward travel direction,
said skid plate comprising an attachment section along which the skid plate is mounted relative to the frame, at least part of said skid plate including a unitary plate element that extends rearwardly from the attachment section to include a lowermost ground-engaging margin, wherein said unitary plate element includes a deformation region located between the attachment section and the ground-engaging margin, the unitary plate element having opposite lateral side edges that extend longitudinally between the attachment section and the ground-engaging margin with at least one transverse slot projecting laterally inboard from a respective one of the side edges such that the unitary plate element is configured to bend along the deformation region in response to a forward-to-aft relative movement between the attachment section and the ground-engaging margin.

2. The plant stalk stomper assembly as claimed in claim 1, wherein said unitary plate element including another transverse slot, with each slot intersecting and projecting laterally inboard from a respective one of the side edges.

3. The plant stalk stomper assembly as claimed in claim 2, wherein each of said transverse slots extends at an oblique angle relative to the respective side edge.

4. The plant stalk stomper assembly as claimed in claim 1 further comprising a plate mounting bracket interconnecting the frame and the skid plate, said plate mounting bracket being attached to the skid plate along the attachment section, with the plate mounting bracket supporting the skid plate so that the attachment section of the skid plate is more rigid than the unitary plate element.

5. The plant stalk stomper assembly as claimed in claim 4, wherein said plate mounting bracket extends to a lowermost bracket end, said deformation region and said lowermost bracket end being longitudinally aligned with one another.

6. The plant stalk stomper assembly as claimed in claim 1, wherein said skid plate is pivotally mounted relative to the frame to pivot about a transverse skid pivot axis.

7. The plant stalk stomper assembly as claimed in claim 6 further comprising a plate mounting bracket pivotally attached to the frame at a skid pivot joint that defines the transverse skid pivot axis, said plate mounting bracket being attached to the skid plate along the attachment section, with the plate mounting bracket supporting the skid plate so that the attachment section of the skid plate is more rigid than the unitary plate element.

8. The plant stalk stomper assembly as claimed in claim 7, wherein said plate mounting bracket extends to a lowermost bracket end, said deformation region and said lowermost bracket end being longitudinally aligned with one another.

9. The plant stalk stomper assembly as claimed in claim 7, wherein said deformation region is spaced rearwardly of the transverse skid pivot axis.

10. The plant stalk stomper assembly as claimed in claim 7 further comprising a spring urging the ground-engaging margin of the skid plate downwardly into a lowermost position.

11. The plant stalk stomper assembly as claimed in claim 10, wherein said spring comprises a torsion spring mounted on the skid pivot joint, said torsion spring engaging the plate mounting bracket to urge the ground-engaging margin downwardly.

12. The plant stalk stomper assembly as claimed in claim 1, wherein said frame comprises a mounting base operable to be attached to the toolbar, said frame further comprising an adjustment bracket that supports the skid plate, said adjustment bracket being pivotally attached to the mounting base at a bracket pivot joint that defines a transverse bracket pivot axis to permit the skid plate to be selectively adjustably positioned relative to the mounting base among a plurality of positions.

13. The plant stalk stomper assembly as claimed in claim 12, wherein said frame includes a fastener removably attached to the adjustment bracket, with the fastener being operable to selectively secure the adjustment bracket relative to the mounting base in one of the positions.

14. The plant stalk stomper assembly as claimed in claim 12, wherein said skid plate is pivotally mounted relative to the adjustment bracket to pivot about a transverse skid pivot axis.

15. The plant stalk stomper assembly as claimed in claim 14 further comprising a plate mounting bracket pivotally attached to the adjustment bracket at a skid pivot joint that defines the transverse skid pivot axis, said plate mounting bracket being attached to the skid plate along the attachment section, with the plate mounting bracket supporting the skid plate so that the attachment section of the skid plate is more rigid than the unitary plate element.

16. The plant stalk stomper assembly as claimed in claim 15, wherein said plate mounting bracket extends to a lowermost bracket end, and said deformation region and said lowermost bracket end are longitudinally aligned with one another.

17. The plant stalk stomper assembly as claimed in claim 15 further comprising a spring urging the ground-engaging margin of the skid plate downwardly into a lowermost position.

18. The plant stalk stomper assembly as claimed in claim 17, wherein said spring comprises a torsion spring mounted on the skid pivot joint, said torsion spring engaging the plate mounting bracket to urge the ground-engaging margin downwardly.

* * * * *